United States Patent
Ueno et al.

(10) Patent No.: US 6,716,519 B2
(45) Date of Patent: Apr. 6, 2004

(54) AIR BAG COVER

(75) Inventors: Shigehiro Ueno, Nishikasugai-gun (JP);
Akiyoshi Nagano, Nishikasugai-gun (JP); Akio Nakano, Nishikasugai-gun (JP); Kenichi Furuta, Nishikasugai-gun (JP); Hiroshi Suyama, Nishikasugai-gun (JP); Yukihiko Horiba, Nishikasugai-gun (JP); Yoshiaki Shichida, Nishikasugai-gun (JP); Toshikatsu Togawa, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/963,511

(22) Filed: Sep. 27, 2001

(65) Prior Publication Data

US 2002/0042235 A1 Apr. 11, 2002

(30) Foreign Application Priority Data

Sep. 29, 2000 (JP) .................................... P. 2000-299158

(51) Int. Cl.[7] .......................... B60R 21/16; B32B 5/14; B32B 5/16
(52) U.S. Cl. .................... 428/308.4; 428/323; 428/324; 428/325; 428/328; 428/500; 280/728.3
(58) Field of Search .............................. 280/728.3, 731, 280/732; 428/308.4, 324, 325, 328, 323, 500

(56) References Cited

U.S. PATENT DOCUMENTS

| | | | | |
|---|---|---|---|---|
| 3,622,176 A | * | 11/1971 | Byer | 280/732 |
| 4,234,636 A | * | 11/1980 | Thorsrud et al. | 428/95 |
| 5,344,183 A | * | 9/1994 | Hersman et al. | 280/728.3 |
| 5,374,079 A | * | 12/1994 | Dukeshire et al. | 280/728.3 |
| 5,407,991 A | * | 4/1995 | Hikasa et al. | 524/491 |
| 5,531,469 A | * | 7/1996 | Iino et al. | 280/728.3 |
| 5,567,375 A | | 10/1996 | Filion et al. | 264/251 |
| 5,698,283 A | * | 12/1997 | Yamasaki et al. | 428/43 |
| 6,065,771 A | | 5/2000 | Kawakubo et al. | 280/728.3 |
| 6,203,056 B1 | * | 3/2001 | Labrie et al. | 280/728.3 |
| 6,318,752 B1 | * | 11/2001 | Warnecke et al. | 280/728.3 |

FOREIGN PATENT DOCUMENTS

| | | |
|---|---|---|
| GB | 2254618 A | 10/1992 |
| JP | A-8-9-91164 | 4/1996 |
| JP | 10-273001 | 10/1998 |
| JP | 11-222089 | 8/1999 |

* cited by examiner

Primary Examiner—Paul Thibodeau
Assistant Examiner—Kevin Kruer
(74) Attorney, Agent, or Firm—Posz & Bethards, PLC (57) ABSTRACT

An air bag cover having a surface sheet including a thermoplastic elastomer decorative layer on the surface side. The breaking elongation and break strength of the thermoplastic elastomer decorative layer is adjusted utilizing a filler powder. Thereby, the breaking rapidity at a tear line groove formation position is improved.

19 Claims, 6 Drawing Sheets

AIR BAG COVER

This application claims priority from Japanese Patent Application No. 2000-299158 which was filed on Sep. 29, 2000, the contents of which are incorporated herein by reference.

BACKGROUND OF THE INVENTION

1. Field of the Invention

The present invention relates to an air bag cover comprising a TPE layer, or a surface sheet with a TPE layer provided.

Although an embodiment of an air bag cover for an air bag device to be assembled in an instrument panel is explained herein, the invention is not limited thereto, but it can be adopted in an air bag cover for an air bag device to be assembled in a side door, a pillar, a front or back sheet, or the like.

Hereafter, abbreviations for polymers mainly used in this specification are presented.

PE . . . polyethylene
PP . . . polypropylene
PS . . . polystyrene
PVC . . . polyvinyl chloride
BR . . . butadiene rubber
EPDM . . . ethylene propylene non-conjugated diene three element copolymer rubber
EPM . . . ethylene propylene copolymer rubber
IIR . . . butyl rubber
SBR . . . styrene butadiene rubber
TPE . . . thermoplastic elastomer Moreover, the breaking elongation of the surface sheet (cutting elongation: $E_B$) and the breaking strength (tensile strength: $T_B$) in this specification are based on a specific tensile test in the test examples described later.

2. Description of the Related Art

Figure 1:
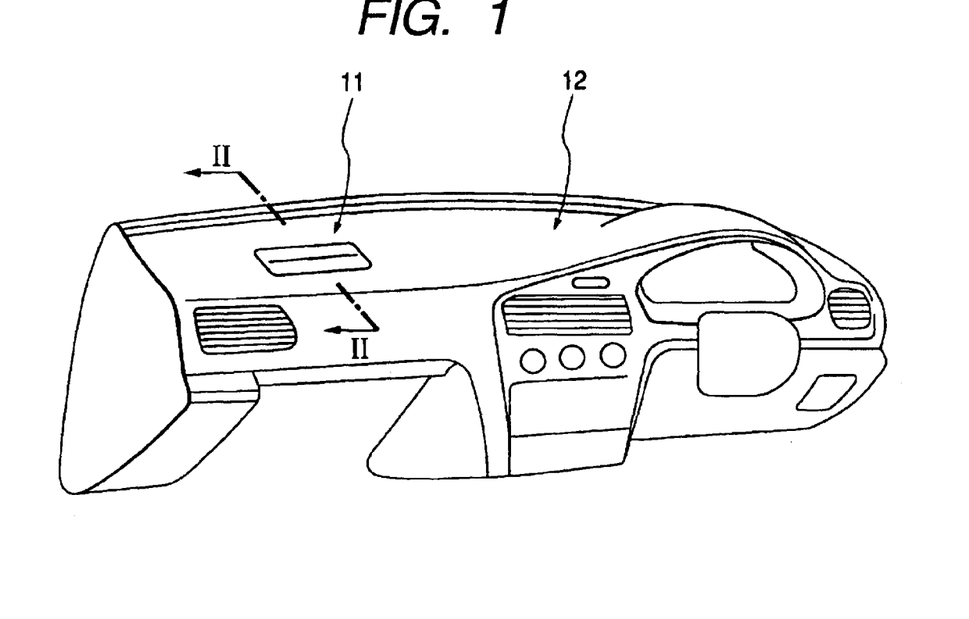
FIG. 1 is a schematic perspective view of an instrument panel as an example of an automobile interior comprising a conventional air bag cover part.
Figure 2:
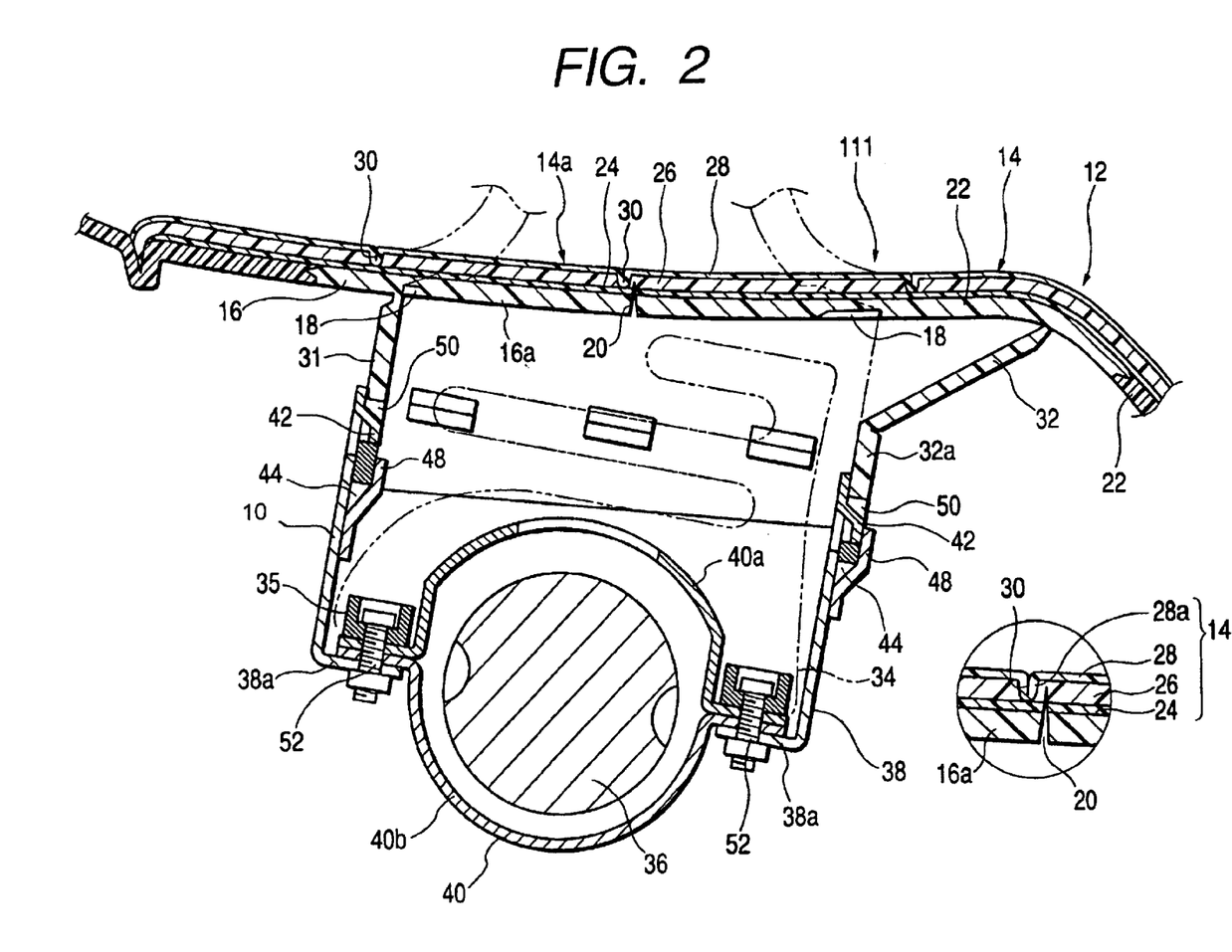
FIG. 2 is a schematic end view taken on the line II—II portion of FIG. 1.

As an air bag cover configuration in an air bag device assembly portion (the portion of the line II—II in FIG. 1) in an instrument panel 12 shown in FIG. 1, for example, those shown in FIG. 2 have been provided. As a known published product with the similar configuration, Unexamined Japanese Patent Publication No. 11-222089, or the like can be presented.

That is, the configuration comprises a cover surface sheet part 14a and a cover base body 16, with a base body door part 16a of the cover base body 16 provided with a hinge groove 18 and a tear line groove 20 on the back side. The cover base body 16 is produced as a first injection molding product, provided integrally with an instrument panel base body 22 as a second injection molding product, on the inner side thereof by two-part injection molding.

Here, the cover surface sheet part 14a is formed as a part of an instrument panel surface sheet 14. The configuration of the surface sheet 14 can be, for example, a three layer configuration from the back side, of a barrier layer 24 made of a thermally resistant resin material, a foamed layer 26 made of a soft foamed resin material, and a decorative layer 28 made of a soft synthetic resin (in general, it is a thermoplastic elastomer "TPE") as shown in the figure.

The air bag cover of the configuration is produced, in general, by shaping the three layer configuration sheet by vacuum molding, and two-part injection molding in the order of the cover base body 16 and the instrument panel base body 22. At the time of the vacuum molding of the sheet, a relief line groove 30 is formed in the vicinity of the hinge groove 18 and the tear line groove 20 near the cover surface sheet part 14a by mold shaping. The relief line groove 30 is mainly for smoothly performing the hinge function and the tear line function. The tear line groove 20 is formed by, for example, providing a notch by an ultrasonic cutting, or the like.

At the time the air bag 34 is expanded, stress is concentrated on the tear line groove 20 formation portion (thick part) of the cover base body 16 so as to rupture the tear line groove 20 formation portion. In the foamed layer 26, stress is concentrated on the portion of the cover base body 26 with the shortest distance with respect to the tear line groove 20 bottom part (minimum section portion) so as to form a crack toward the relief line groove 30 tip end portion. The relief line groove 30 is ruptured by stress concentration on the tip end portion of an embedded pleat part 28a of the surface sheet 14.

An air bag cover 11 is jointed to the air bag device 10 via front and rear mounting walls 31, 32, projecting from the back surface of the cover base body 16. The rear mounting wall 32, which is formed straight at the time of molding, has a tip end mounting part 32a bendable like a hinge at the time of mounting (see FIG. 5).

The air bag device 10 comprises basically an air bag 34, an inflator 36, a bag case 38 for storing and attaching the same with the air bag cover 11, and a diffuser pipe 40. In the example shown in the figure, the bag case 38 having a planar lateral rectangular box-like shape, comprises engaging claws 42, 42 on both sides in the longitudinal direction each by a predetermined distance, and therebelow front and rear receiving bars 48, 48 comprising front and rear receiving grooves 44, 44 to be fitted with the lower ends of front and rear mounting walls 31, 32. Moreover, the diffuser pipe 40 having a configuration wherein upper and lower half-split member 40a, 40b are jointed on both sides by a flange, is integrated with a bottom part inside flange 38a of the bag case 38 by a bolt 52, or the like by co-fastening. At the time, by co-fastening the opening part of the folded air bag 34 simultaneously via a retainer ring 35, the air bag 34 is attached and stored in the bag case 38. By pushing the front and rear mounting walls 31, 32 into the receiving grooves 44, 44, the engaging claws 42, 42 are fitted and engaged with engaging holes 50, 50 formed in the front and rear mounting walls 31, 32 so as to joint the air bag device 10 and the air bag cover 11.

In the case of the air bag cover of the above-mentioned configuration, in order to support the rotation opening at the time of expanding the bag of the bag door part, existence of the relief line formed by embedding the surface sheet decorative layer, is essential. Due to the existence of the relief line, the air bag cover is limited in terms of design as well as a complicated vacuum molding mold of the surface sheet is needed as mentioned in the above-mentioned official gazette. Particularly in the case a sophisticated breaking rapidity is required in the tear line, the relief line is need to be formed relatively deeply so that a thin and high rib for a relief line needs to be formed in the vacuum molding mold. The rib formation further increases the difficulty in the mold production as well as deteriorates the mold durability.

SUMMARY OF THE INVENTION

In view of the circumstances, an object of the invention is to provide an air bag cover capable of relatively reducing the depth of or eliminating a relief line groove formed by the embedded pleat part of the surface sheet (decorative layer).

In order to solve the problems, the inventors have found out that the door opening performance can be ensured at the time of expanding the bag with a shallower depth of or without formation of the relief line groove by reducing the stretchability of the surface sheet in the effort in the elaborate development process so as to invent the air bag cover with the following configuration.

An air bag cover comprising a TPE layer, or a surface sheet with a TPE layer provided on the surface side, wherein the breaking elongation of the TPE material for the TPE layer is adjusted by containing a filler, is provided.

According to the configuration, stress is concentrated from the back side on the tear line groove formation portion, which is a notch portion, in the bag cover at the time of developing and inflating the air bag. At the time, since the breaking elongation is set at a lower level by containing an inorganic filler in the TPE material, it is broken rapidly at the tear line groove compared with the conventional examples. Therefore, the relief line groove can be provided shallower with respect to the tear line groove of the bag cover compared with the conventional examples, or can be eliminated.

As the embodiments of the air bag cover capable of adopting the invention, the following air bag covers can be presented.

An air bag cover having a surface sheet with a plural layer configuration comprising from the back side a barrier layer made of a thermally resistant resin material, and a decorative layer made of a TPE material, with or without a foamed layer made of a soft foamed resin material provided there between, with the surface sheet provided integrally with a cover base body.

An air bag cover having a surface sheet with a two layer configuration comprising from the back side a foamed layer made of a soft foamed resin material, and a decorative layer made of a thermoplastic elastomer (TPE) material, with the surface sheet provided integrally with a cover base body.

An air bag cover having a surface sheet with a one layer configuration comprising only a decorative layer, surface sheet and a cover base body provided integrally via a foamed layer provided by injecting resin between the cover base body and the surface sheet.

The content ratio of a filler in the case the filler is an inorganic filler, is in general, about 5 to 30% by mass, preferably about 5 to 13% by mass. The range of the content ratio of the filer facilitates the breaking rapidity of the surface sheet so as to achieve the object of the invention.

Moreover, the breaking elongation (in a specific tensile test) of the TPE material in the case a filler is contained in the TPE material is about 100% or less, preferably about 50% or less. Thereby, the breaking rapidity of the surface sheet can further be facilitated so as to achieve the object of the invention.

Features and advantages of the invention will be evident from the following detailed description of the preferred embodiments described in conjunction with the attached drawings.

DETAILED DESCRIPTION OF THE PREFERRED EMBODIMENTS

Hereinafter, embodiments of the invention will be explained. The parts corresponding to the described examples, and the parts in the embodiments corresponding with each other are applied with three-figure numerals with the lower two figures provided commonly, and the explanation thereof may be omitted totally or partially.

In the description below, the composition unit, and the composition ratio is based on the "% by mass (% by weight)" unless otherwise specified.

Figure 3:
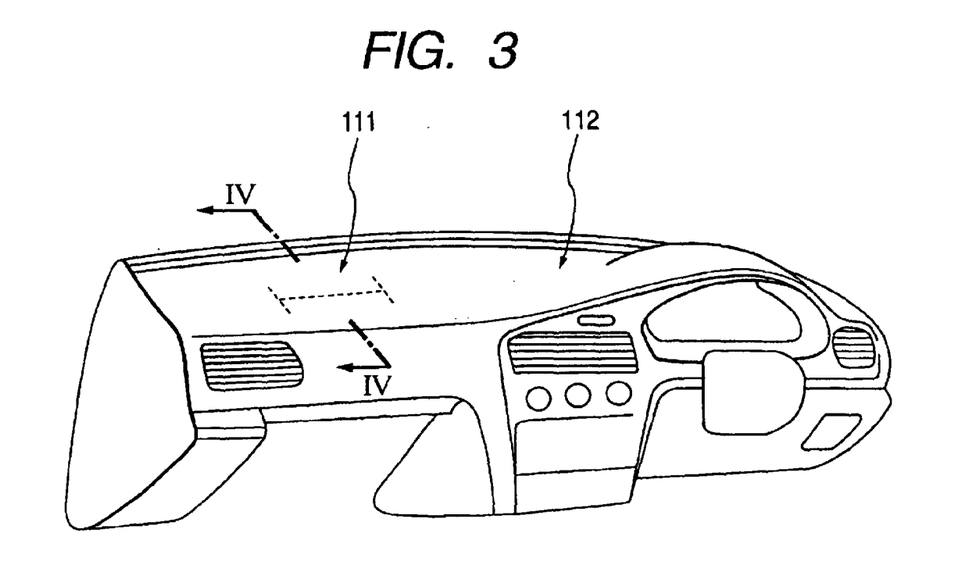
FIG. 3 is a schematic perspective view of an instrument panel as an example of an automobile interior comprising an air bag cover part according to the invention.
Figure 4:
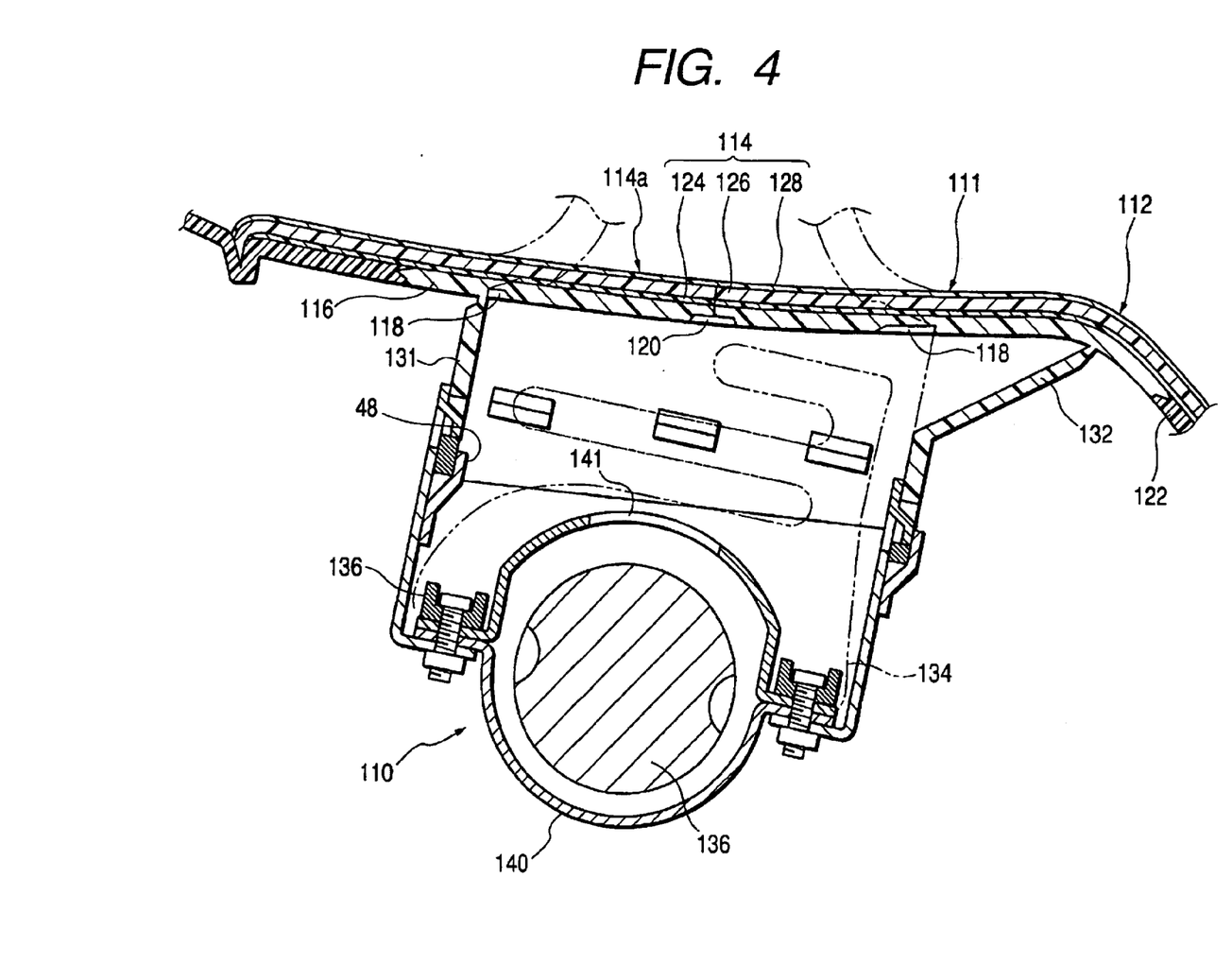
FIG. 4 is a schematic end view of an air bag cover part (air bag device jointed state) according to an embodiment of the invention taken on the line IV—IV portion of FIG. 3.

An embodiment of the invention is shown in FIGS. 3 and 4. FIG. 4 is a schematic end view taken on the line IV—IV of FIG. 3.

The air bag cover of the embodiment has the following configuration similar to the one shown in FIG. 2 as the premise.

A surface sheet 114 has a three layer configuration comprising from the back side a barrier layer 124 made of a thermally resistant resin material, a foamed layer 126 made of a soft foamed resin material, and a decorative layer 128 made of a thermoplastic elastomer (TPE) material, with the surface sheet 114 provided integrally with a cover base body 116. The cover base body 116 is, in general, an injection molding product, but it can be provided by an optional molding method, such as a compression molding, and a vacuum molding.

That is, the surface sheet 114 prepared in the three layer configuration is cut in a predetermined shape. Thereafter, with the cut sheet heated and shaped by a vacuum molding, a material of the cover base body 116 is injection molded so as to mold the cover base body 116. An instrument panel base body 122 is molded with a non-polar synthetic resin material having a structure strength, thermally fusible with the material of the cover base body 116, such as a fiber reinforced PP (FPP). The vacuum molding conditions of the surface sheet depend on the material and size of the surface sheet, and further the molding shape, but in general, they are a 86 to 96 kPa vacuum pressure, a 160 to 190° C. heating temperature, and 35 to 60 s.

The air bag cover 111 according to this embodiment is assembled in an instrument panel 112 as shown in FIG. 3. As in the described example, it comprises the surface sheet 114 and the cover base body 116. The cover base body 116 is an injection molding part in contact with the back surface of the surface sheet 114. A hinge groove 118 is provided on the back surface of the cover base body 116 by post-process. Furthermore, the surface sheet 114 comprises a barrier layer 124 made of a thermally resistant resin disposed on the side contacting the cover base body 116. As mentioned above, the embodiment shown in the figure has a three layer configuration (plural layer configuration) including from the back side the barrier layer 124 made of a thermally resistant resin, the foamed layer 126 made of a soft foamed resin material, and a decorative layer 128 made of a TPE material having the excellent feeling.

The surface sheet 114 and the cover base body 116 in the air bag cover 111 concretely has the following size specification. The surface sheet 114 may have a two layer configuration without the foamed layer 126, that is, with a 0 mm foamed layer thickness.

In the case the surface sheet 114 thickness is 0.8 to 6.2 mm, the thickness of each layer can be as follows: 0.4 to 1.5 mm for the barrier layer 124, 0 to 4 mm for the foamed layer 126 and 0.4 to 0.7 mm for the decorative layer (skin layer) 128.

In the configuration, the decorative layer 128 in this embodiment is a TPE layer disposed on the surface side of the surface sheet 114. As a TPE material for forming the TPE layer, one containing a filler for providing the breaking elongation (cutting elongation) at a predetermined value or smaller. Since the decorative layer 128 is formed with a material not having an anisotropy (orientation), preferably by an extrusion from a T mold a press sheet, or a two-axes drawn film.

The TPE used for the TPE material can be polyolefin based (TPO), polystyrene based (TPS), polyvinyl chloride based, polyester based, polyamide based, urethane based, chlorinated PE, or the like, and it is not particularly limited.

It is preferable to use the TPO as the TPE from the viewpoint of the weather resistance, the lightweight, or the like. More specifically, it is preferable to use an olefin based resin (hard phase)/non-polar rubber (soft phase) blended type material. Here, the olefin based resin/non-polar rubber (ratio by mass) is 60/40 to 15/85, preferably 50/50 to 30/70. In the case the resin amount is too little, the elongation is too large so that the breaking elongation can hardly be at a predetermined value or less. In contrast, in the case the resin amount is too large, the resin property is increased so that a soft feeling can hardly be obtained.

As the olefin based resin, in general, a material made of PP (either homogeneous, block, or random copolymer), or containing PP as the main component, and blended with low density PE, high density PE, linear low density PE, or the like, can be used.

As the non-polar rubber, ethylene-α olefin based rubber (EPM, EPDM), hydrogenated SBR, hydrogenated BR, hydrogenated IIR, or the like can be presented. Here, the ethylene-α olefin based rubber includes binary copolymers which is obtained by copolymerization of ethylene with α olefin such as propylene, 1-butene, and 1-heptene (in particular, propylene), and also ternary copolymers which is obtained by copolymerization of the binary copolymer with a small amount of non-conjugated diene sulfur-vulcanizably. As the non-conjugated diene, ethylidene norborenene (ENB), dicyclopentadiene (DCPD), 1,4-hexadiene (1,4-HD), or the like can be presented.

As the filler to be added to the TPE material, it is not particularly limited as long as the filler addition effect of lowering the breaking elongation can be realized, and thus inorganic or organic (a hard synthetic resin, a crushed material of plant seeds, or the like) fillers may be used. However, in general, an inorganic filler is used.

As the inorganic filler, for example, powders of talc (talc, phyllosilicate), heavy calcium carbonate, light calcium carbonate, kaolin clay, zinc oxide, zirconium oxide, titanium oxide, and mica, or the like; fibrous materials, such as glass fiber, whisker, metal fiber, polycrystalline fiber, or the like, can be presented. These can optionally be used alone or selected two or more materials in a combination.

The particle size of these inorganic fillers is, in general, about 0.2 to 100 μm, preferably about 2 to 50 μm. In the case the particle size is too small, the breaking strength is increased so that the contribution to the breaking rapidity by the decrease of the breaking elongation may be offset.

In particular, among these examples, since a commercially available talc with a 2 to 10 μm average particle size can easily provide a compact (decorative layer) with a good surface texture, it is preferable.

Moreover, as to the content ratio of the filler, in the case the filler is an inorganic filler, it is about 3 to 30%, preferably about 5 to 20%, further preferably about 8 to 13%. In the case the filler content is too low, a predetermined breaking elongation (100% or less, preferably 50% or less in a specific tensile test) can hardly be obtained so that the breaking rapidity for achieving the object of the invention can hardly be provided. In contrast, in the case the filler content ratio is too high, the breaking elongation cannot be made smaller than that, and in contrast, the surface sheet flexibility is lost so that a soft feeling (touch) can hardly be obtained. And furthermore, the breaking strength becomes too high so that the cover breaking rapidity may be hindered.

By adding the filler, in general, the breaking strength (tensile strength) is increased inevitably, but the breaking strength increase amount is preferably as small as possible. As mentioned above, in the case the breaking strength is increased too much, even if the elongation amount is small, consequently the energy needed for the breakage becomes too large so that the breaking rapidity can hardly be ensured.

The upper limit of the breaking elongation (tensile strength) is preferably 600 N/50 mm or less, and further preferably 450 N/50 mm or less, in the high strength direction in a two-axis drawn type as shown in the test example later described.

The materials for forming the foamed layer 126 and the barrier layer 124, other than the decorative layer 128, are same as the conventional products.

The soft foamed resin material (open cell type) for forming the foamed layer 126 is not particularly limited as long as it can provide an appropriate cushion property to the surface sheet. In general, a soft foamed resin material thermally fusible with the decorative layer 128 is used.

For example, in the case a TPE material based on an olefin based TPO is used for the decorative layer 128, a soft resin foaming material with a 10 to 30 times expansion ratio, preferably 15 to 25 times expansion ratio by cross-linking or partial cross-linking with an α olefin based material, such as a PP, a PE, and a PB, is used. Here, a cross-linking type material is used for preventing generation of choking (crush) of the foamed cells due to the injection pressure and the heat conduction from the injection material (resin) at the time of injection molding of the cover base body 116 and the instrument panel base body 122 later described.

Moreover, in the case the expansion ratio is too small, a necessary softness can hardly be ensured so that an appropriate cushion property can hardly be obtained. In contrast, in the case the expansion ratio is too large, an appropriate cushion property can hardly be obtained due to the excessive softness, and furthermore, the risk of the choking (crush) generation of the foamed cells is involved due to the injection pressure at the time of injection molding of the cover base body 116 and the instrument panel base body 122 later described.

The thermally resistant resin material for forming the barrier layer 124 is not particularly limited as long as it has a heat resistance capable of protecting the foamed layer 126 from the injection material at the time of injection molding of the cover base body 116 and the instrument panel base body 122, and a shaping property capable of following the mold surface at the time of vacuum shaping of the surface sheet material. In general, a thermally resistant resin material thermally fusible with the foamed layer 126 is used.

In the case the olefin resin based soft foamed resin material is used for the foamed layer 126, basically, the glass fiber filled polyolefins (for example, a PP including a glass fiber), and the olefin based TPE materials as the materials for forming the decorative layer 128, with the resin component ratio increased, and/or with the inorganic filler composition amount increased for improving the heat resistance and the strength, can be used. At the time, since the barrier layer 124 will be cut at the time of forming the post-processed tear line groove 120, it is preferable to use an inorganic filler with a high reinforcing property in terms of the barrier property improvement.

For example, the olefin based resin/non-polar rubber (ratio by mass) is 60/40 to 90/10, preferably 70/30 to 80/20. Moreover, the content ratio of the inorganic filler may be 5 to 30% as in the case of the decorative layer 128, but it is preferably 15 to 25% from the viewpoint of the heat resistance. Furthermore, as to the particle size of the inorganic filler, it is preferable to use a half active or active filler with a 10 µm or less size, preferably a2 µm or less size from the viewpoint of reinforcing property.

Those usable as the olefin based resin, the non-polar rubber, and the inorganic filer are same as the TPE materials for the decorative layer.

Moreover, the thickness of the cover base body 116 is 2.5 to 4 mm, in general, about 3.5 mm at the post-processed tear line groove 120 formation portion.

The cover base body (base material part) 116 is formed mainly with an olefin based (TPO) or styrene based (SBC) non-polar TPE in view of the scattering prevention, the thermal fusibility with the surface sheet part, and the lightweight. In the case the cover base body and the surface sheet are bonded with an adhesive, the material is not limited thereto.

As the TPO usable for the cover base body, the following types can be presented, but from the viewpoint of the heat resistance, or the like, a partially cross-linked blended type, or a completely cross-linked blended type are preferable.

I. Blended type: produced by mechanically blending an olefin based rubber (EPDM, EPM, IIR, or the like) as a soft phase (rubber component) and a polyolefin resin as a hard phase (resin component).

II. Partially cross-linked blended type: produced by partial cross-linking of the rubber component in the blended type with a cross-linking agent such as an organic peroxide. The partial cross-linking of the rubber component is carried out by partially cross-linking at the time of blending the rubber and the resin with a cross-linking agent added, or by kneading with a preliminarily partially cross-linked rubber component added.

III. Completely cross-linked blended type: a composite material having the resin component in a continuous phase, and the completely cross-linked rubber component in a dispersed phase, produced by adding a vulcanization type chemical including a sulfur, or the like in the state with the rubber component and the resin component kneaded so as to be a molten product, for completely cross-linking the rubber component (dynamic cross-linking).

Moreover, similarly, as the SBC usable for the cover base body, the following types can be presented, but from the viewpoint of the weather resistance, the hydrogenated SEBS, and SEPS are preferable.

I. ABA type tri block: a tri block material having polystyrene (PS) in a hard phase, and a conjugated diene based rubber, such as polybutadiene (BR), and polyisoprene (IR) in a soft phase. Examples thereof include PS-BR-PS (SBS), PS-IR-PS (SIS), and hydrogenated products thereof, such as PS-poly(ethylene-butylene)-PS(SEBS), and PS-poly(ethylene-propylene)-PS (SEPS).

II. $(AB)_nX$ type radial block: a material synthesized in the case the number n of the functional groups of the coupling agent is 3 or more at the time of synthesizing the tri block type by a coupling reaction.

Moreover, as to the form of the tear line groove 120, although the embodiment shown in the figure has an H shape with the doors opened to both sides (double door), a C shape opened to one side may be used as well. Furthermore, as to the depth of the tear line groove 120, in general, it is a depth capable of certainly cutting the barrier layer 124, with the notch with respect to the foamed layer 126 at most by about half or less. The post-processed tear line groove 120 is formed preferably by an ultrasonic welder from the viewpoint of the accuracy and the cost, but a method such as a cutter, and a laser may be adopted as well.

The instrument panel base body 122 is formed with a glass fiber reinforced PP (for example, a 40% glass fiber content ratio), or the like from the viewpoint of the thermal fusibility with respect to the cover base body 116 and the surface sheet barrier layer 124, and the structure strength.

Next, usage of the embodiment will be explained.

As mentioned above, the air bag device 110 is assembled on the instrument panel 112 comprising the air bag cover (part) 111 via the front and rear mounting walls 131, 132 formed on the back side of the bag cover 111 so as to be mounted on an automobile.

In the case the automobile receives the impact by a predetermined value or more, the air bag 134 is inflated by a gas flowing from the inflater 136 via a gas outlet opening 141 of the diffuser pipe 140 so that the corresponding portion of the tear line groove 120 of the bag cover 111 by the inflation force of the air bag 134. Since the bag door is rotated around the hinge as the axis so as to open the air bag jump out opening, the air bag 134 gets out there from and is inflated so as to protect the passenger.

In the description, even though the relief line (embedded pleat part) is not provided in the cover surface sheet 114a as in the conventional example, the foamed layer 126 and the decorative layer 128 of the surface sheet 114 are broken quickly at a position corresponding to the tear line groove 120. That is, in the case the decorative layer 128 has a breaking elongation smaller than the conventional products, and stress is concentrated on the tear line groove 120 formation portion, the expansion delay of the air bag 134 due to the surface sheet elongation is not generated.

In some cases, the relief line groove may be provided, but the depth of the relief line groove maybe provided shallower than that of the conventional products. Moreover, from the viewpoint of the design, a shallow design groove like a relief line may optionally be provided.

Figure 5:
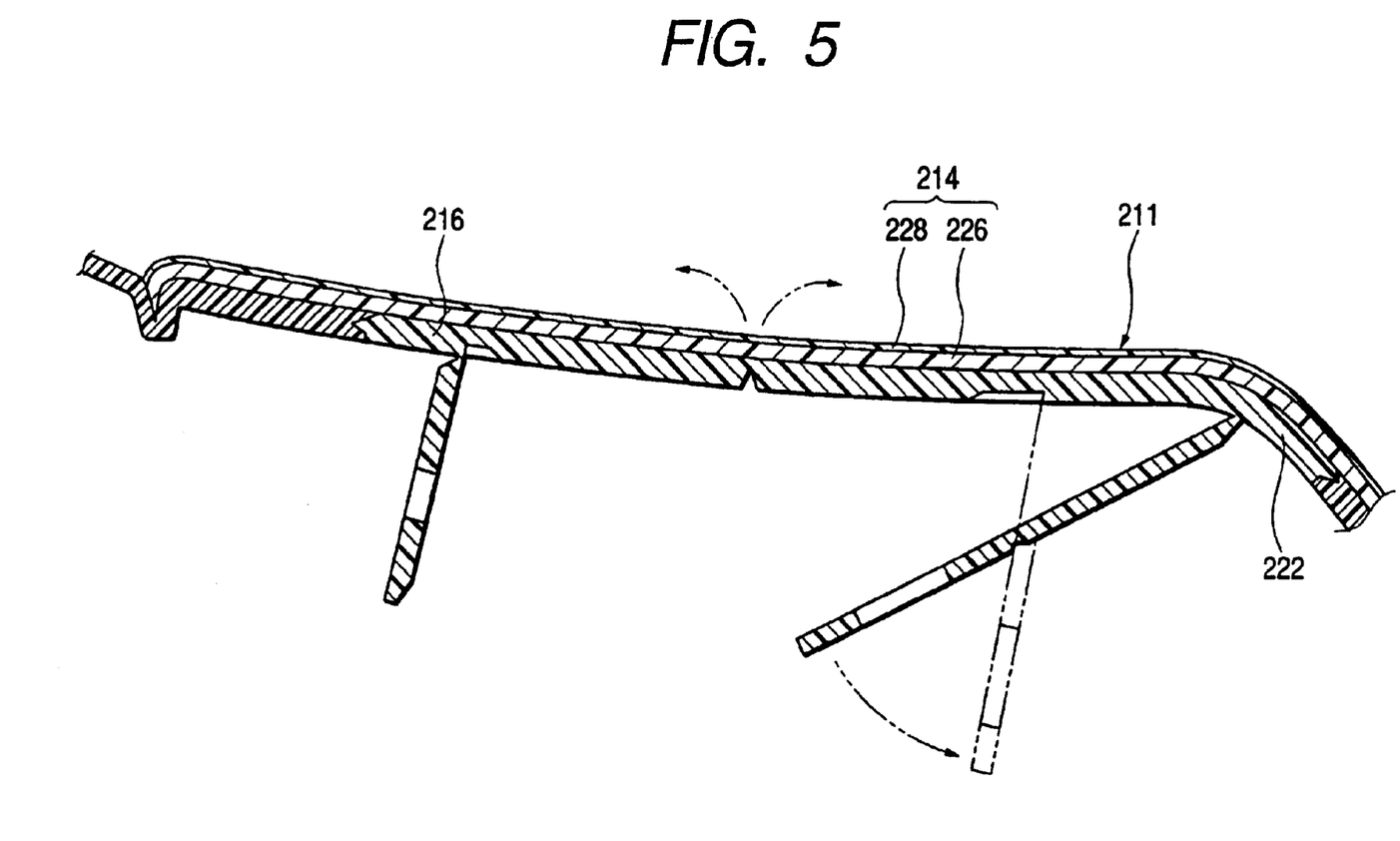
FIG. 5 is a principal part schematic end view of an air bag cover part (air bag device unjointed state) according to another embodiment of the invention.
Figure 6:
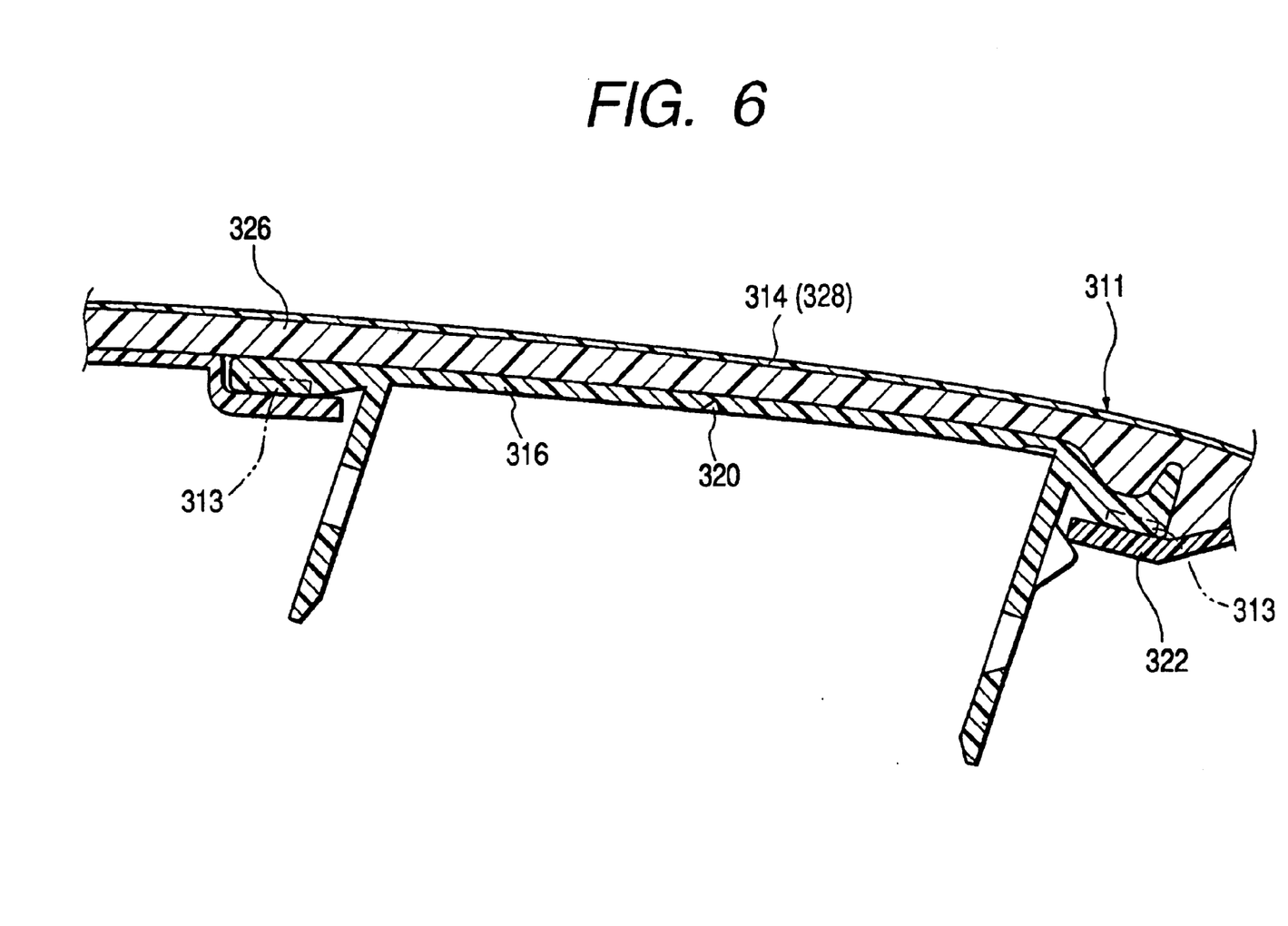
FIG. 6 is a principal part schematic end view of an air bag cover part (air bag device unjointed state) according to still another embodiment of the invention.

FIGS. 5 and 6 are end views of the air bag cover part each of different embodiment.

The air bag cover 211 shown in FIG. 5 has a surface sheet 214 of a two layer configuration comprising from the back side a foamed layer 226 made of a soft foamed resin material, and a decorative layer 228 made of a TPE material, provided integrally with a cover base body 216 produced by low pressure molding. Here, the low pressure molding is so-called stamping molding. As the surface sheet 214, those without a barrier layer for protecting the foamed layer at the time of molding the cover base body 216 (barrier layerless type) may be used.

For example, in the state with the surface sheet 214 of the two layer configuration set in one (in general, the upper mold) of the upper and lower half split mold (not shown) by vacuum molding in the open state, the materials for the cover base body 216 and the instrument panel base body 222 of the embodiment each by a predetermined amount are supplied in a molten state to the upper mold surface sheet set surface by a cylinder supply device for each material. Thereafter, the mold is closed immediately so as to fill the cavity with the molten material. After cooling and solidifying the resins, it is taken out.

At the time, it is also possible to mold the cover base body and the instrument panel base body simultaneously, or stamp-mold the compact having a complicated shape like the front and rear mounting walls.

In this embodiment, since the surface sheet 214 does not have a barrier layer, the tear line groove 220 can be molded simultaneously at the time of the stamping molding. At the time, the remaining thickness of the cover base body 216 at the tear line groove 220 portion is set to be 0.5 mm or less for ensuring the breaking rapidity. The tear line groove may be formed by post-processing.

The size and the material for the surface sheet 214, the cover base body 216, and the instrument panel base body 222 are basically same as the embodiment shown in FIG. 4.

The air bag cover 311 shown in FIG. 6 has a surface sheet 314 of a one layer configuration comprising only a decorative layer 328. The surface sheet 314 and a cover base body 316 are provided integrally via a foamed layer 326 post-molded with a soft foamed resin disposed therebetween.

That is, the instrument panel base body 322 and the cover base body 316 are molded independently each with a different material (such as the former: FPP, the latter: TPO as mentioned above), and then integrated by a urethane seal 313, or the like.

Next, the TPE sheet made of a TPE material including a filler as mentioned above to be the surface sheet 314 is set in one (in general, the upper mold) of the foam molding mold (not shown) as well as the instrument panel base body 322/cover base body 316 integrated product is set in the mold. After vacuum shaping of the surface sheet (TPE sheet) while heating, a foamed resin material, such as a polyurethane is introduced between the base body integrated product 322/316 and the surface sheet 314. After completing foaming, it is released from the mold so as to obtain an air bag cover according to this embodiment. At the time, the embedded pleat part (to provide a relief line) need not be formed in the surface sheet, and thus the mold structure can be simplified as mentioned above.

Also in this embodiment, since the barrier layerless surface sheet is used, as in the above embodiment, the tear line groove 320 can be formed at the time of molding the cover base body 316. At the time, the remaining thickness in the cover base body 316 at the tear line 320 formation portion is set to be 0.5 mm or less as in the case shown in FIG. 5.

The size for the surface sheet (decorative layer) 314, the cover base body 316, the instrument panel base body 322, and the foamed layer 326 are basically same as the embodiment shown in FIG. 4. Moreover, the material is basically same except the foamed layer (an RIM foaming urethane in the embodiment shown in the figure).

The usage of the embodiments shown in FIGS. 5 and 6 are basically same as the embodiment shown in FIG. 4. However, due to the minimum thickness in the tear line groove 220, 320 of the cover base body 216, 316 and absence of the notch in the foamed layer 226, 326, the breaking rapidity may be hindered slightly, but substantially it is not problematic because stress is concentrated in the thin part so as to easily break the surface sheet.

An test example executed for the three layer surface sheet in order to confirm the effects of the invention will be explained.

The total thickness of the three layer surface sheet was 3.7 mm, and the specification of each layer was as follows.

The decorative layer (0.7 mm) was a TPE layer made of a TPE material with a talc (average particle size 3 $\mu$m) included in a PP/EPDM=20/80 olefin based TPE so as to have the indicated content ratio.

The foamed layer (2.0 mm) was a cross-linked foamed material based on a PP with a 20 times expansion ratio.

The barrier layer (1.0 mm) was a reinforced TPE layer made of a TPE material with a talc (average particle size 3 $\mu$m) included in a PP/EPDM=20/80 olefin based TPE so as to have a 20% content ratio.

Figure 7:
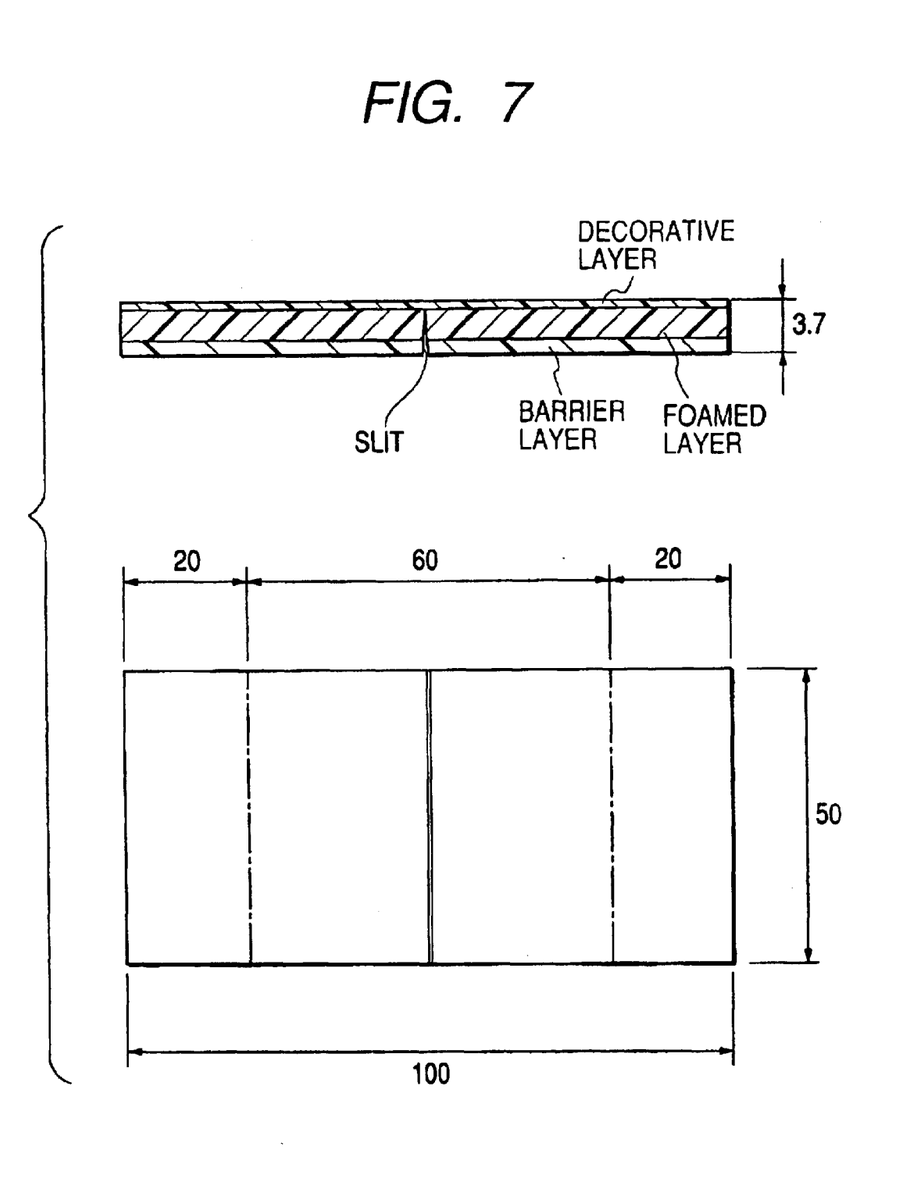
FIG. 7 is a sectional view and a plan view with sizes of the test piece used in the tensile test.

In a rectangular piece (100 mm length×50 mm width) of a size shown in FIG. 7, cut out from the surface sheet of the above specification, a slit of about a 1.5 mm depth was formed in the central part as shown in the figure by an ultrasonic cutter so as to prepare test pieces (n=5 pieces).

The test pieces were chucked by a 20 mm chuck margin (inter-chuck distance: 60 mm). A tensile test was executed by a 200 mm/min tensile speed so as to find the breaking strength (tensile strength: $T_B$) and the breaking elongation (cutting elongation: $E_B$)

From the table 1 shown the results of the test, it is confirmed that the embodiments 1, 2 including an inorganic filler (talc) have not much increase of the breaking elongation (tensile strength) and a dramatically lowered breaking elongation (cutting elongation) compared with the case of the comparative example not including the inorganic filler (talc). That is, in the case the surface sheet is adopted in the air bag cover, the breaking rapidity at the tear line groove portion can be improved without a relief line.

TABLE 1

|  | TPE material talc content ratio in the decorative layer (%) | Breaking strength (N/50 mm) | Breaking elongation (%) |
|---|---|---|---|
| Comparative Example | Talc 0% | 180 | 200 or more |
| Embodiment 1 | Talc 10% | 325 | 16.1 |
| Embodiment 2 | Talc 15% | 504 | 16.5 |

The present invention is not limited to the mode for carrying out the invention and the embodiment thereof at all, and includes various modifications that can be conceived easily by those skilled in the art, without departing from the scope of claim.

What is claimed is:

1. An air bag cover comprising:
    a cover base body wherein a hinge groove is formed in the cover base body; and
    a surface sheet comprising:
        a barrier layer made of a thermally resistant resin material, wherein a tear line groove is formed in the cover base body and the barrier layer; and
        a outer decorative layer made of a thermoplastic elastomer material, wherein the decorative layer is integrally located on the cover base body through the barrier layer, and the breaking elongation of the thermoplastic elastomer material for the decorative layer is adjusted by containing a filler powder in the thermoplastic elastomer material, wherein the thermoplastic elastomer material has a breaking elongation of 100% or less and a breaking strength of 600 N/50 mm or less.

2. An air bag cover according to claim 1, wherein the breaking elongation of the thermoplastic elastomer material is about 50% or less.

3. An air bag cover according to claim 1, wherein the air bag cover further comprises a foamed layer located between the outer decorative layer and the said barrier layer, and the foamed layer is made of a soft foamed resin material.

4. An air bag cover according to claim 1, wherein the decorative layer lacks a relief line.

5. An air bag cover according to claim 1, wherein the filler powder has a particle size, and the particle size is 2 to 10 μm.

6. An air bag cover according to claim 1, wherein the filler powder in the thermoplastic elastomer material is inorganic filler powder and the content ratio thereof is about 5 to 30% by mass.

7. An air bag cover according to claim 6, wherein the content ratio of the inorganic filler powder is about 5 to 13% by mass.

8. An air bag cover comprising:
a cover base body, wherein a tear line and a hinge groove are formed in the cover base body; and
a surface sheet comprising:
a foamed layer made of a soft foamed resin material, wherein the surface sheet is integrally located on the cover base body through the foamed layer; and
a outer decorative layer made of a thermoplastic elastomer material, wherein the breaking elongation and the breaking strength of the thermoplastic elastomer material of the decorative layer are adjusted by containing a filler powder in the thermoplastic elastomer material, wherein the thermoplastic elastomer material has a breaking elongation of 100% or less and a breaking strength of 600 N/50 mm or less.

9. An air bag cover according to claim 8, wherein the breaking elongation of the thermoplastic elastomer material is about 50% or less.

10. An air bag cover according to claim 8, wherein the decorative layer lacks a relief line.

11. An air bag cover according to claim 8, wherein the filler powder has a particle size, and the particle size is 2 to 10 μm.

12. An air bag cover according to claim 8, wherein the powder filler in the thermoplastic elastomer material is inorganic powder filler, and the content ratio thereof is about 5 to 30% by mass.

13. An air bag cover according to claim 12, wherein the content ratio of the inorganic powder filler is about 5 to 13% by mass.

14. An air bag cover comprising:
a cover base body;
a surface sheet comprising only a outer decorative layer, wherein the breaking elongation and the breaking strength of a thermoplastic elastomer material of the surface sheet are adjusted by containing a filler powder in the thermoplastic elastomer material such that the thermoplastic elastomer material has a breaking elongation of 100% or less and a breaking strength of 600 N/50 mm or less; and
a foamed layer made of foamed resin, the foamed layer being provided between the cover base body and the surface sheet by injecting resin between the cover base body and the surface sheet.

15. An air bag cover according to claim 14, wherein the breaking elongation of the thermoplastic elastomer material is about 50% or less.

16. An air bag cover according to claim 14, wherein the decorative layer lacks a relief line.

17. An air bag cover according to claim 14, wherein the filler powder has a particle size, and the particle size is 2 to 10 μm.

18. An air bag cover according to claim 14, wherein the powder filler in the thermoplastic elastomer material is inorganic filler, and the content ratio thereof is about 5 to 30% by mass.

19. An air bag cover according to claim 18, wherein the content ratio of the inorganic powder filler is about 5 to 13% by mass.

* * * * *